United States Patent
Jung et al.

(10) Patent No.: US 7,345,267 B2
(45) Date of Patent: Mar. 18, 2008

(54) OPTICAL SYSTEM HAVING ELEMENT FOR CORRECTING ABERRATION OF MIRROR AND OPTICAL PICKUP APPARATUS EMPLOYING THE SAME

(75) Inventors: Mee-suk Jung, Suwon-si (KR); Jin-seung Sohn, Seoul (KR); Sung-dong Suh, Seoul (KR); Eun-hyoung Cho, Seoul (KR); Hae-sung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 11/206,841

(22) Filed: Aug. 19, 2005

(65) Prior Publication Data
US 2006/0049330 A1    Mar. 9, 2006

(30) Foreign Application Priority Data
Sep. 9, 2004    (KR) ............... 10-2004-0072087

(51) Int. Cl.
*G01J 1/20*    (2006.01)
(52) U.S. Cl. .............................. 250/201.9; 369/112.05; 369/112.08; 369/112.09; 369/112.15
(58) Field of Classification Search ............. 250/201.9; 369/112.01, 112.15, 112.1, 112.05, 112.08, 369/112.09
See application file for complete search history.

(56) References Cited

U.S. PATENT DOCUMENTS

| | | | |
|---|---|---|---|
| 4,866,694 A | 9/1989 | Korth | |
| 5,633,852 A * | 5/1997 | Maruyama et al. | 369/112.08 |
| 5,694,230 A | 12/1997 | Welch et al. | |
| 6,819,646 B1 * | 11/2004 | Kitaoka et al. | 369/112.01 |
| 2002/0021650 A1 | 2/2002 | Ogawa et al. | |
| 2005/0237900 A1 * | 10/2005 | Sano et al. | 369/112.08 |

FOREIGN PATENT DOCUMENTS

| | | |
|---|---|---|
| EP | 0 949 611 A2 | 10/1999 |
| JP | 10-334498 A | 12/1998 |
| JP | 2001-344845 A | 12/2001 |
| JP | 2004-233410 A | 8/2004 |

OTHER PUBLICATIONS

English translation of JP10-334498.*
Andersen G et al:, "Holographically Corrected Telescope for High-Bandwith Optical Communications", Applied Optics, OSA, Optical Society of America, Washington, DC, US, vol. 38, No. 33, Nov. 20, 1999, pp. 6833-6835, XP000903739.
Andersen G et al: "Compact Holographic Correction of Aberrated Telescope", Applied Optics, OSA, Optical Society of America, Washington, DC, US, vol. 36, No. 7, Mar. 1, 1997, pp. 1427-1432, XP000684840.
Andersen G et al.: "Holographically Corrected Microscope With a Large Working Distance", Applied Optics, OSA, Optical Society of America, Washington, DC, US, vol. 37, No. 10, Apr. 1, 1998, pp. 1849-1853, XP000754335.

* cited by examiner

*Primary Examiner*—Georgia Epps
*Assistant Examiner*—Stephen Yam
(74) *Attorney, Agent, or Firm*—Sughrue Mion, PLLC

(57) ABSTRACT

An optical system including a light source that generates light, a mirror changing an optical path of the light generated by the light source and an aberration correcting element that corrects aberrations generated in the light reflected from the mirror due to an error in the surface shape of the mirror.

16 Claims, 9 Drawing Sheets

REFERENCE MIRROR

OPTICAL SYSTEM HAVING ELEMENT FOR CORRECTING ABERRATION OF MIRROR AND OPTICAL PICKUP APPARATUS EMPLOYING THE SAME

BACKGROUND OF THE INVENTION

This application claims priority from Korean Patent Application No. 10-2004-0072087, filed on Sep. 9, 2004, in the Korean Intellectual Property Office, the disclosure of which is incorporated herein in its entirety by reference.

1. Field of the Invention

The present invention relates to an optical system having an element for correcting mirror aberrations, and an optical pickup apparatus employing the same, and more particularly, to a an optical system in which aberrations generated due to an error in the surface shape of a mirror are corrected using a hologram optical element, and an optical pickup apparatus employing the same.

2. Description of the Related Art

FIG. 1 illustrates the configuration of a typical optical pickup apparatus. As shown in FIG. 1, an optical pickup apparatus 100 comprises a light source 110, a mirror 120 that is an optical path changer, an optical path separation member 130, an objective lens 140 and a photodetector 150. The light source 110 emits light that is reflected by the mirror 120 to be incident on the optical path separation member 130. The optical path separation member 130 comprises a polarization diffraction element 132 that either linearly transmits or diffractively transmits incident light according to the polarization state of the incident light, a quarter wave plate (QWP) 134 changing the state of the polarization of incident light, and coating layers 131, 133, 135 for protecting the polarization diffraction element 132 and the QWP 134. According to the above configuration, the light reflected by the mirror 120 transmits the optical path separation member 130 as it is and proceeds further. However, the light reflected by an optical disc D is diffracted at a predetermined angle by the optical path separation member 130. Thus, the light reflected by the mirror 120 does not proceed toward the light source 110 and is received by the photodetector 150.

Conventionally, in manufacturing an optical pickup apparatus, the respective optical parts are separately manufactured and then assembled into an optical pickup apparatus. However, as the need for mass production of compact optical pickup apparatuses increases, an integrated optical pickup apparatus has been developed as one of methods to remove difficulties in an assembly process. The integrated optical pickup apparatus is generally manufactured by combining a light emitting portion, a light receiving portion and an optical path separating portion, except for the objective lens that is a light collecting portion, into an optical bench, and integrating the optical benches. As a result, the assembly process is simplified and the mass production of optical pickup apparatuses can be made easy.

FIG. 2 illustrates an example of an integrated optical pickup apparatus. As shown in FIG. 2, an integrated optical pickup apparatus 200 comprises a mirror bench 210, a light receiving bench 220, an optical path separation portion 230 and an objective lens 240. A groove 211 is formed in an upper surface of the mirror bench 210 and a first inclined mirror 212 and a second inclined mirror 215 are formed at opposite ends of a bottom surface 213 of the groove 211. A light source 222 for emitting light toward the second inclined mirror 215 and a photodetector 221 for receiving light reflected by the first inclined mirror 212 are installed at a lower surface 225 of the light receiving bench 220. Also, the optical path separation portion 230 and the objective lens 240 are installed at a position facing the second inclined mirror 215. The optical path separation portion 230 comprises, as described above, a polarization diffraction element 231 that linearly transmits or diffractively transmits incident light according to the polarization state of the incident light and a quarter wave plate 233 changing the state of the polarization of incident light.

The mirror bench 210 is manufactured by wet etching silicon according to a general semiconductor process. However, when a mirror is manufactured in a wet etching method, the etching is not uniform. As shown in FIG. 3, the surface of the mirror is uneven, which generates aberrations such as astigmatism. In particular, this problem is severe in the case of an optical pickup apparatus comprising a large numerical aperture (NA) that uses a short wavelength according to the high capacity of a storage medium. The mirror used in the optical pickup apparatus requires a peak-to-valley (PV) value to be not more than ⅙ of a wavelength. When such a condition is applied to a reference wavelength of a blue-ray disc that is 407 nm, the PV value must be not more than 67.8 nm. However, in the case of a mirror manufactured in the wet etching method, since the PV value (or waviness) is about 150-250 nm, the above condition is difficult to meet. Although a conventionally manufactured mirror that is polished after molding can meet the required PV value, the conventional method is not appropriate for the mass production of integrated optical pickup apparatuses and is costly.

SUMMARY OF THE INVENTION

To solve the above and/or other problems, the present invention provides a an optical system in which aberration generated due to an error in the shape of a surface of a mirror is corrected using a correction element having a simple diffractive pattern so that an optical system having a desired performance can be obtained. Also, when the present invention is applied to an optical system needing an accurate shape of a surface of a mirror, the same optical performance is obtained and time and cost for manufacturing the mirror can be reduced.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides an optical system having an element for correcting aberration of a mirror, and an optical pickup apparatus employing the same.

According to an aspect of the present invention, an optical system comprises a light source that generates light, a mirror changing an optical path of the light generated by the light source, and an aberration correcting element that corrects aberrations generated in light reflected from the mirror due to an error in the surface shape of the mirror.

The aberration correcting element is a holographic optical element in which an aberration correction pattern is disposed on a surface thereof. The aberration correction pattern of the holographic optical element has an aberration value having a sign opposite to an aberration value of the mirror.

According to another aspect of the present invention, an optical pickup apparatus comprises a light source that generates light, a mirror changing an optical path of the light generated by the light source, an aberration correcting element that corrects aberrations generated in light reflected from the mirror due to an error in the surface shape of the mirror, an objective lens optical system that concentrates the light reflected by the mirror onto an optical disc, a photodetector that detects information by receiving light reflected from the optical disc, and an optical path separation member disposed on an optical path between the objective lens optical system and the photodetector and refracting the light reflected from the optical disc towards the photodetector.

The aberration correcting element is a holographic optical element in which an aberration correction pattern is disposed on a surface thereof. The aberration correction pattern of the holographic optical element has an aberration value having a sign opposite to an aberration value of the mirror.

The objective lens optical system comprises a diffractive lens correcting chromatism due to a change in wavelength of the light generated by the light source and an Aspheric-Plano refractive lens focusing incident light on the optical disc. The optical path separation member comprises a polarization diffractive element that linearly transmits or diffractively transmits incident light according to a polarization state of the incident light, a quarter wave plate changing the polarization state of the incident light, a coating layer disposed on one surface of the polarization diffraction element and on each of input/output surfaces of the quarter wave plate.

The holographic optical element is coupled to any one of the optical path separation member, the refractive lens and diffractive lens.

Additional aspects and/or advantages of the invention will be set forth in part in the description which follows and, in part, will be apparent from the description, or may be learned by practice of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

Figure 1:
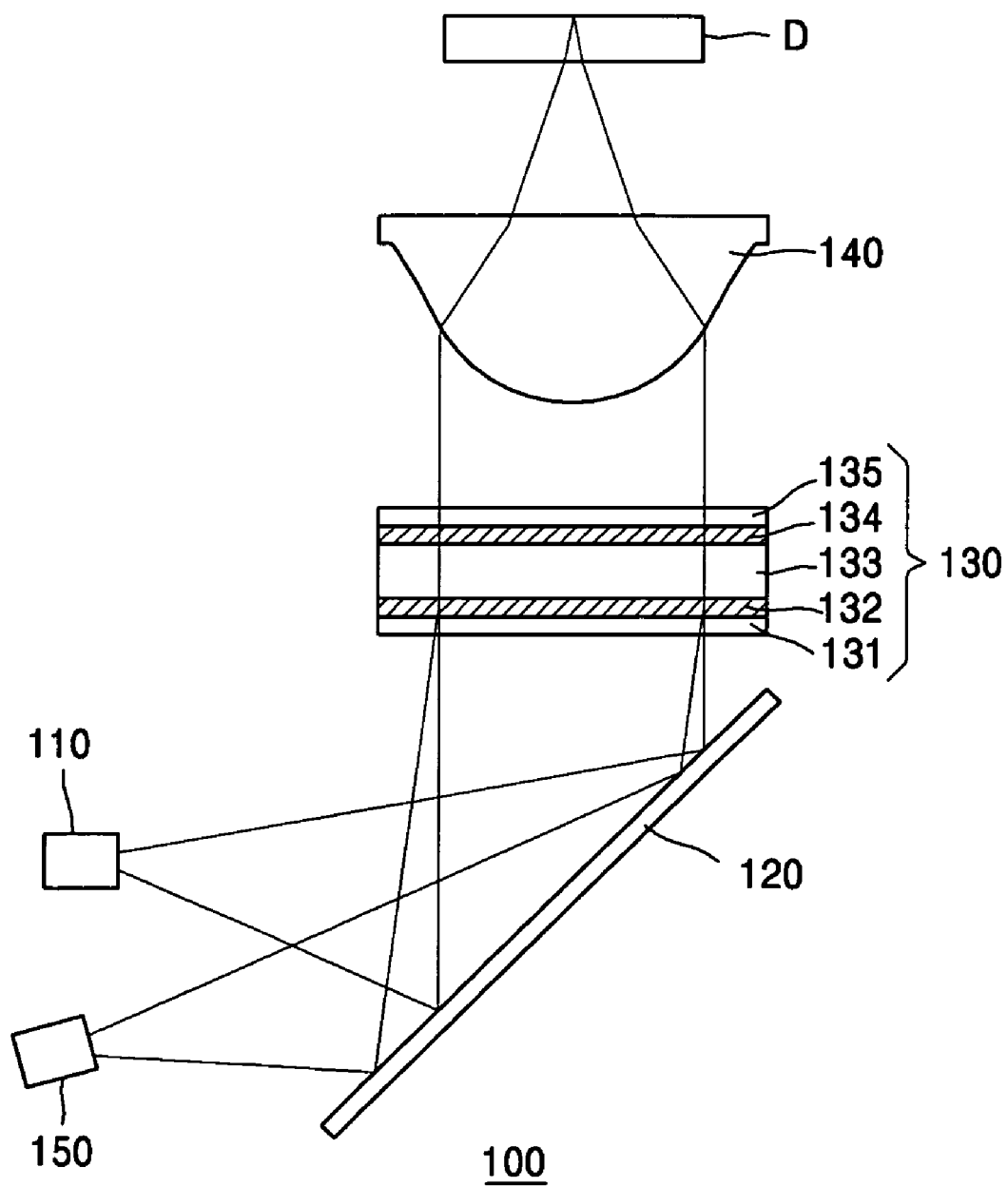
FIG. 1 is a view illustrating the configuration of a typical optical pickup apparatus.
Figure 2:
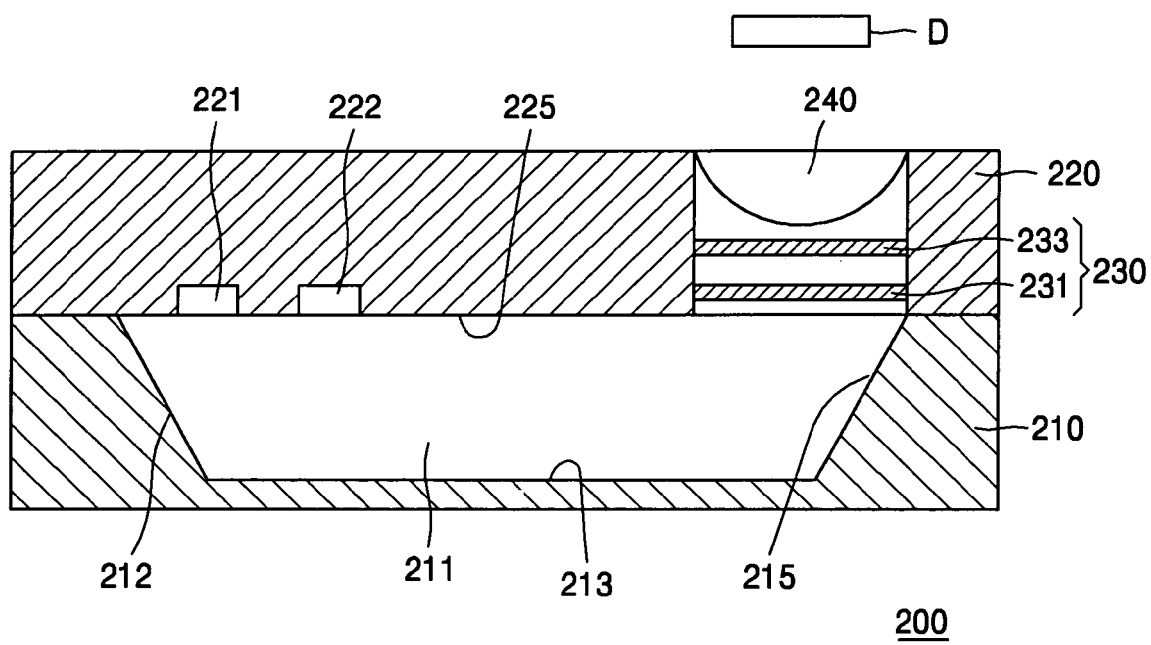
FIG. 2 is a cross-sectional view illustrating the configuration of an integrated optical pickup apparatus.
Figure 3:
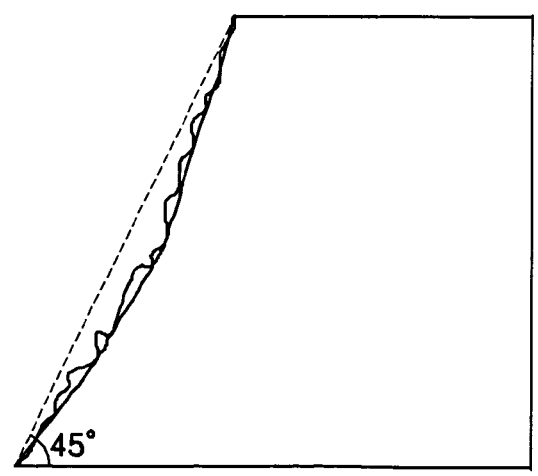
FIG. 3 is a view illustrating an uneven surface of a mirror manufactured in a wet etching method.
Figure 4A:
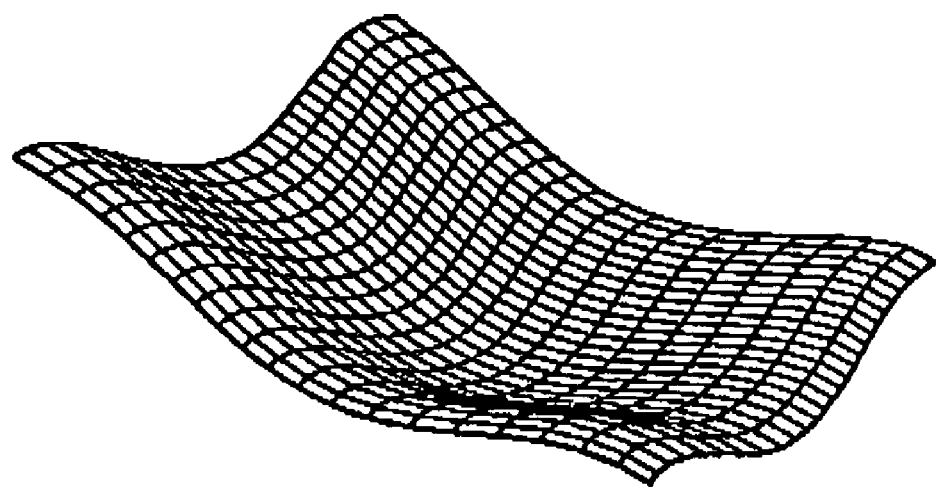
FIGS. 4A through 4D are 3-D graphs illustrating a variety of shapes of the mirror manufactured in a wet etching method.
Figure 4B:
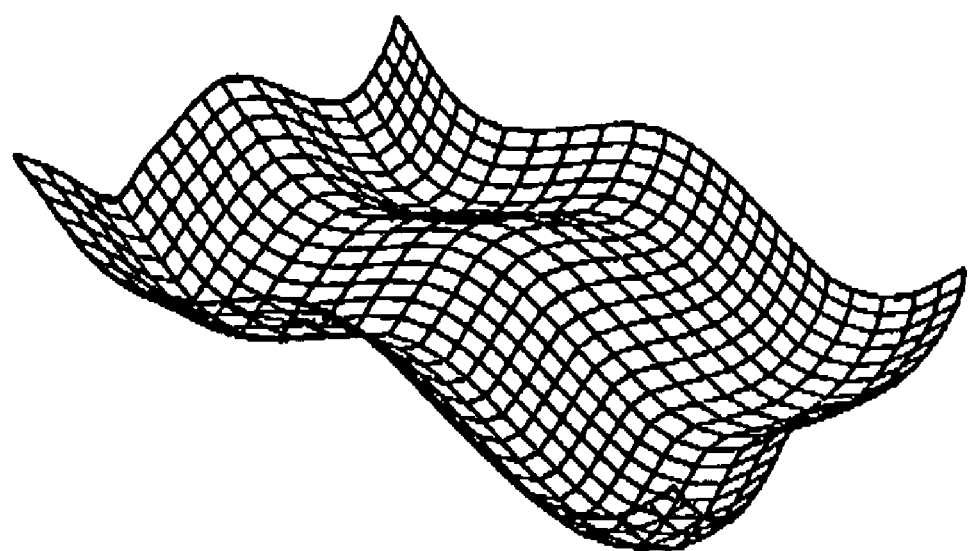
Figure 4C:
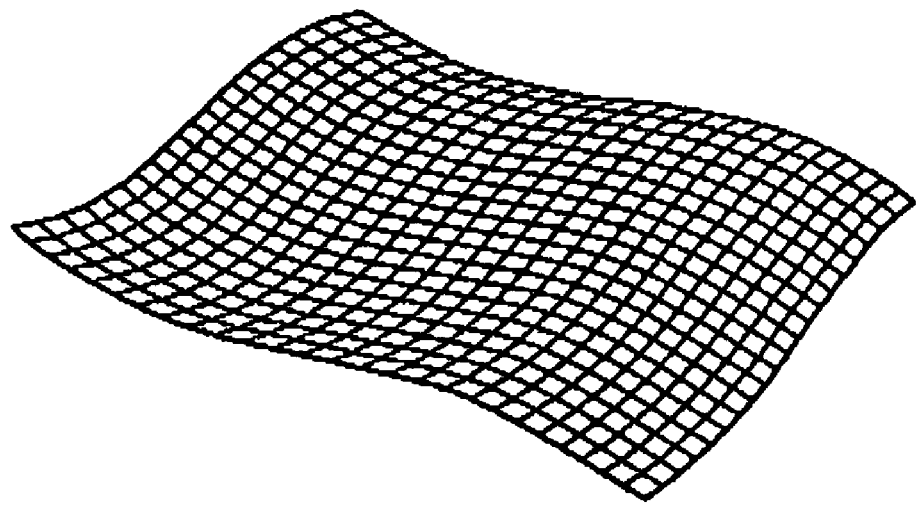
Figure 4D:
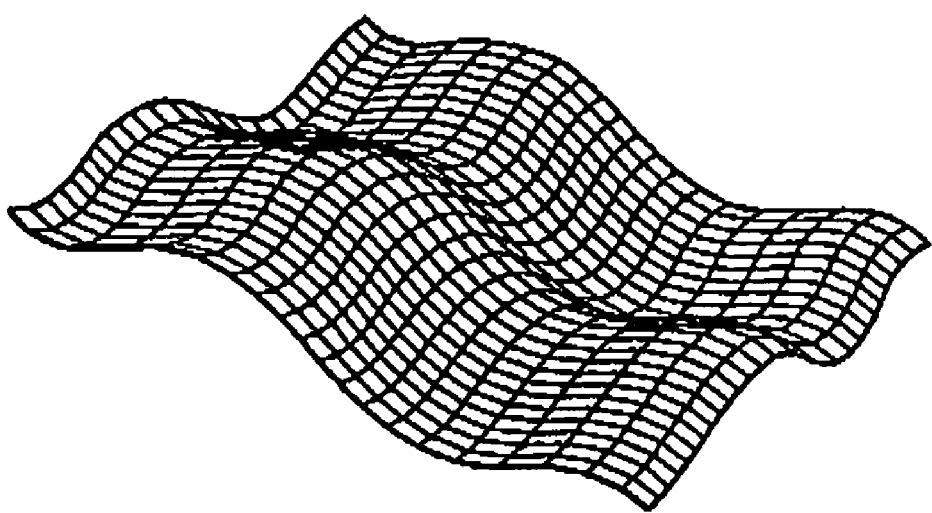

FIGS. 4A through 4D show uneven surfaces of a mirror manufactured in a wet etching method. Although the surfaces of a mirror can have a variety of shapes according to the etching environment, the surface of a mirror has a cosine shape as shown in FIGS. 4A and 4B or a sine shape as shown in FIGS. 4C through 4D. The error in the shape of a mirror causes aberrations, such as astigmatism and defocus. For example, as shown in FIG. 3, when a mirror has an uneven surface shape in a cosine form and a PV value of 200 nm (that is, waviness equals 200 nm), as shown in Table 1, the value of astigmatism is +0.1430 and the value of defocus is −0.2148.

Thus, when a correction element having an aberration value having the opposite sign to that of the aberration value generated by the mirror is arranged on an optical path of the light reflected by the mirror, the aberration generated by the mirror can be offset. In this case, a combination of the mirror and the correction element provides performance that is substantially identical to the performance of a mirror having an almost flat surface.

Figure 5:
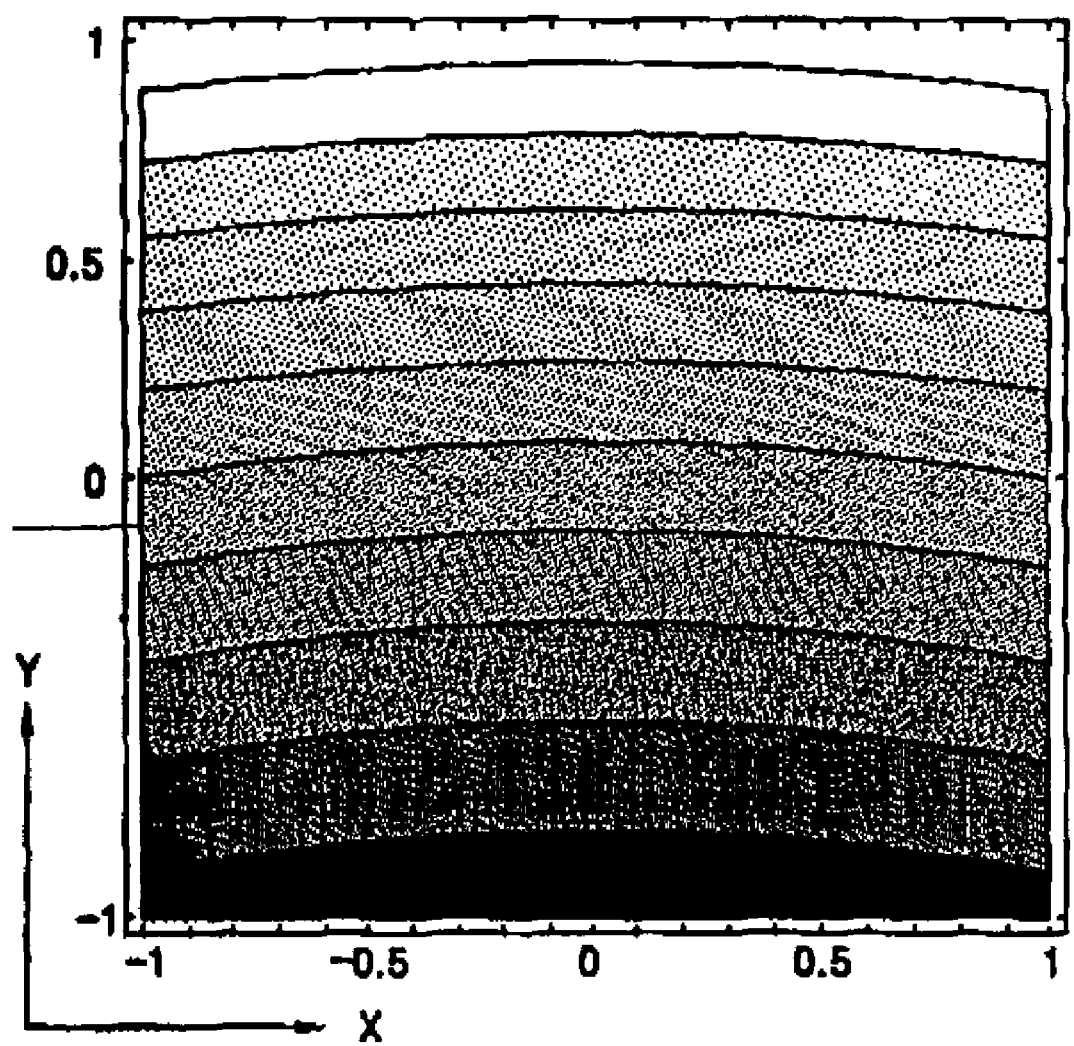
FIG. 5 shows a hologram optical element having a predetermined correction pattern formed on a surface thereof according to a principle of the present invention.

FIG. 5 shows an example of a hologram optical element (HOE) comprising a predetermined correction pattern formed on a surface thereof according to a principle of the present invention. A pattern coefficient used in the correction pattern of the HOE shown in FIG. 5 comprises asymmetrical coefficients of terms y, $x^2$, and $y^2$. The coefficient to be used can be changed according to the surface shape error that results from manufacturing a mirror.

Generally, the shape of the correction pattern of the HOE shown in FIG. 5 can be expressed with a function, such as the following Equation 1. Also, a cosine function and a sine function can be expanded, such as the following Equation 2. Thus, when the shape of the mirror surface has a cosine form, a correction pattern to correct mirror aberrations can be obtained by selecting appropriate values as coefficients $b_1$, $a_2$, and $b_2$ of the term y, $x^2$, and $y^2$ of Equation 1 according to the aberration value of the mirror to be corrected. Also, when the shape of the mirror surface has a sine form, a correction pattern can be obtained by selecting appropriate values as coefficients $a_1$, $b_1$, $a_3$, and $b_3$ of the terms x, y, $x^3$, and $y^3$ of Equation 1 according to the aberration value of the mirror to be corrected.

$$f(x,y)=a_0+b_0+a_1x+b_1y+a_2x^2+b_2y^2+a_3x^3b_3y^3+ \qquad \text{[Equation 1]}$$

$$\cos(ax) = 1 - \frac{(ax)^2}{2!} + \frac{(ax)^2}{4!} - \frac{(ax)^6}{6!} + \frac{(ax)^8}{8!} \ldots \qquad \text{[Equation 2]}$$

$$\sin(ax) = ax - \frac{(ax)^3}{3!} + \frac{(ax)^5}{5!} - \frac{(ax)^7}{7!} + \ldots$$

For example, when the coefficients $b_1$, $a_2$, and $b_2$ of the correction pattern are 0.0017, 0.0013, and 0.0024, respectively, the values of astigmatism and defocus of the HOE having the correction pattern are −0.1194 and +0.1997, respectively, as shown in Table 1. When a mirror having an uneven surface in a cosine form and a PV value of 200 nm is used with an HOE having the above-described coefficient values, the overall aberration of an optical system is as shown in Table 1, that is, the value of astigmatism is +0.0255 and the value of defocus is −0.0168. That is, the overall aberration is remarkably reduced. It is possible to further reduce the aberration by determining the coefficients of higher terms in Equation 1 (that is, $x^{2n}$, $y^{2n}$, $x^{3n}$, $y^{3n}$, n=1,2,3, . . . ). However, the aberration can be sufficiently reduced by only determining the coefficients of the terms of the second power. Since the number of coefficients determining the pattern of the HOE is small, the manufacture of the HOE to correct aberration of a mirror is very easy. In this case, since a minimum pitch between the correction patterns of the HOE must be at least 10 µm, there is no need to concern about the reduction of optical efficiency in the optical system due to the HOE.

Figure 6A:
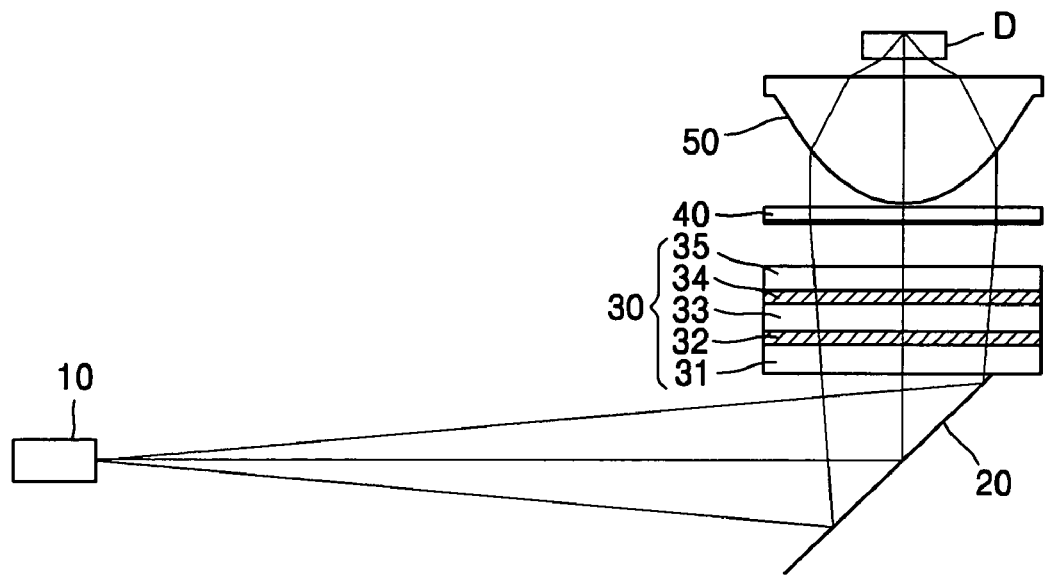
FIGS. 6A through 6C are views showing the results of improved performance of an optical pickup apparatus when the hologram optical element having a correction pattern formed according to the present invention is applied to the optical pickup apparatus.
Figure 6B:
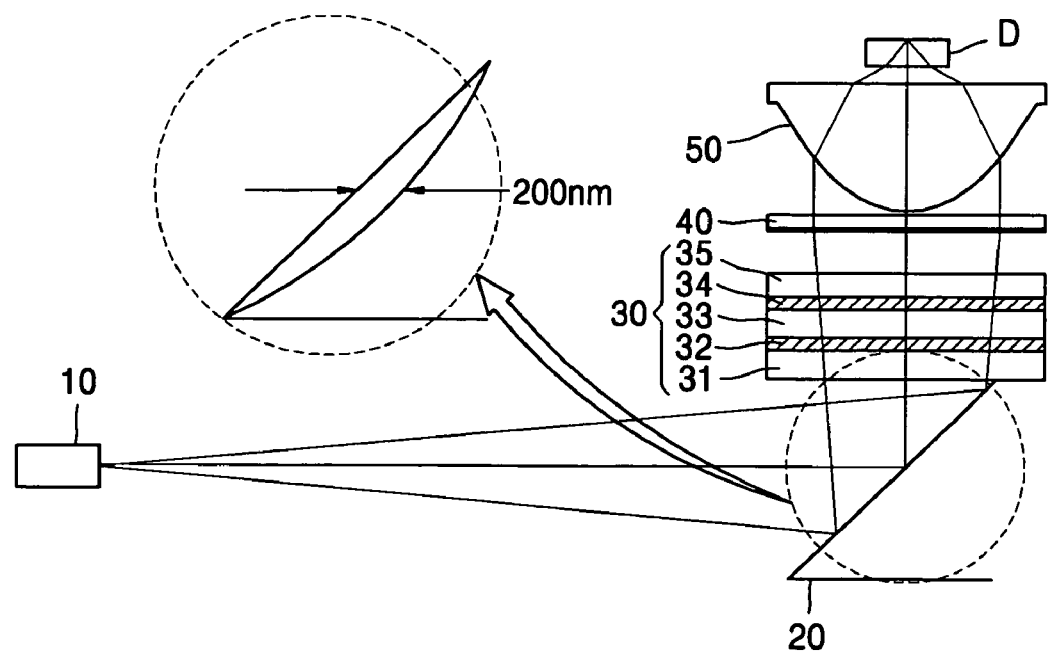
Figure 6C:
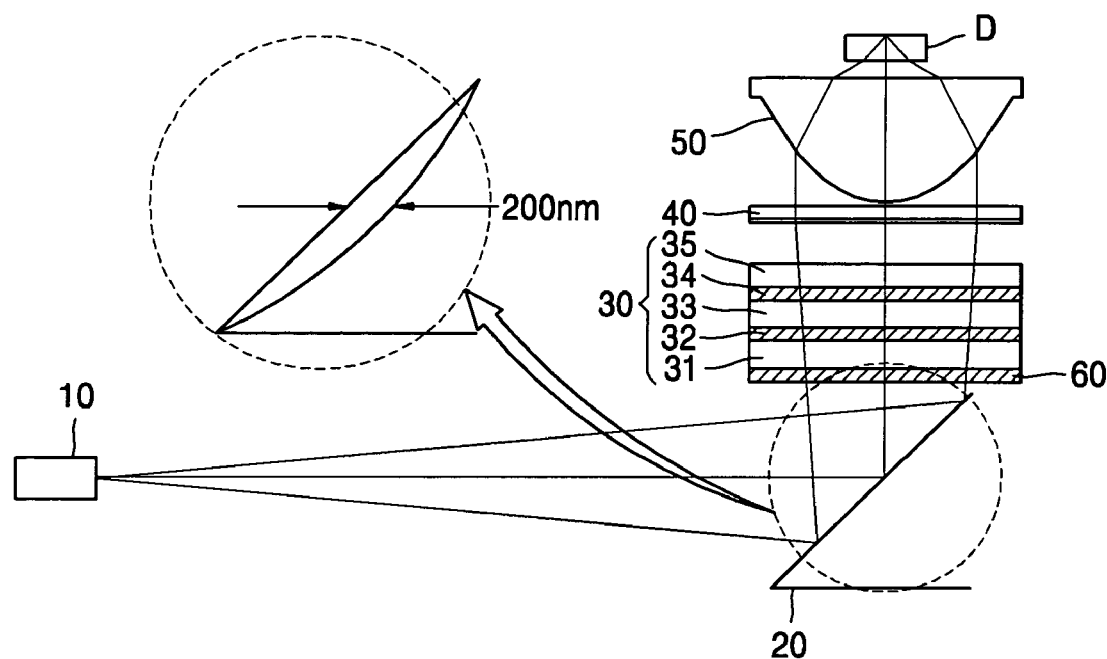

FIGS. 6A through 6C are views showing the results of improved performance of an optical pickup apparatus when the HOE having a correction pattern formed according to the present invention is applied to the optical pickup apparatus. As shown in FIGS. 6A through 6C, the light emitted from a light source 10 reflects off a mirror 20, and passes through an optical path separation member 30, a diffractive lens 40 and a refractive lens 50. The diffractive lens 40 and the refractive lens 50 comprise an objective lens. The light emitted from the refractive lens 50 is focused on an optical disc D. The optical path separation member 30 comprises a polarization diffractive element 32 that linearly transmits or diffractively transmits incident light according to the polarization state of the incident light, a quarter wave plate (QWP) 34 changing the polarization state of the incident light, and coating layers 31, 33, 35 protecting the polarization diffractive element 32 and the QWP 34. The diffractive lens 40 that comprises a portion of the objective lens corrects chromatism according to a change in the wavelength of the light generated by the light source 10, and the refractive lens 50 focuses the light. A Fresnel lens, for example, is used as the diffractive lens 40. The refractive lens 50 that is the other part of the objective lens is an Aspheric-Plano lens.

FIG. 6A shows a case in which the mirror of the optical pickup apparatus is a completely flat. FIG. 6B shows a case in which the mirror of the optical pickup apparatus has an uneven surface in a cosine form and a PV value is 200 nm. FIG. 6C shows a case in which a HOE 60 according to the present invention is applied to the optical pickup apparatus of FIG. 6B. For each case, the values of wave front errors (WFE) at an on-axis position and an off-axis position are shown in Table 2.

Referring to Table 2, when the mirror is completely flat (that is, waviness=0 nm), the WFE value at the on-axis position is 0.0014λ with respect to a reference wavelength of 407 nm, which means that aberration hardly exists. Generally, the WFE value allowed in the optical pickup apparatus is 0.04 λ or less. In contrast, when the surface of the mirror is uneven as shown in FIG. 6B, the WFE value at the on-axis position with respect to the reference wavelength of 407 nm is 0.0588λ which exceeds by far the allowance. When the HOE 60 for correcting aberration of the mirror according to the present invention is used, the WFE value at the on-axis position with respect to the reference wavelength 407 nm is remarkably reduced to 0.0056λ. In this case, the correction pattern coefficients of the HOE 60 are such that $b_1$=0.0017, $a_2$=0.0013, and $b_2$=0.0024. Compared to the case of FIG. 6B, performance is improved by factor of 10. Thus, when the HOE 60 as shown in FIG. 6C is to be used, although the surface of a mirror is uneven, an optical pickup apparatus exhibiting very superior optical property can be provided.

In the case of a mirror manufactured in large quantities by wet-etching a silicon wafer, the PV value of the mirror can be different for each wafer. Also, the wavelength of a light source has a certain degree of a spectrum range and the mirror is not always arranged accurately with respect to the light source. If the correction pattern of the HOE needs to be separately designed according to the PV value of each mirror or the wavelength of the light source, such a method is not appropriate for mass production. Thus, the HOE needs to allow a certain degree of allowance, which is described below.

Table 3 shows a case in which the allowance range of a HOE designed for a case in which the PV value of a mirror is 200 nm is 200 nm (±100 nm). When the PV value of a mirror is within a range between 100 nm through 300 nm, the WFE values at the on-axis and off-axis positions are indicated in Table 3. Referring to Table 3, the maximum WFE value with respect to the reference wavelength of 407 nm is 0.0306λ, which is not greater than an allowable value of 0.04λ. The maximum WFE value in the overall wavelength range including 402 nm and 412 nm is 0.0344λ, which is also not greater than 0.04λ. Thus, it can be seen that the HOE designed for a case in which the PV value is 200 nm has a very stable aberration correction capacity with respect to a mirror having the PV value within a range between 100 nm through 300 nm.

Figure 7:
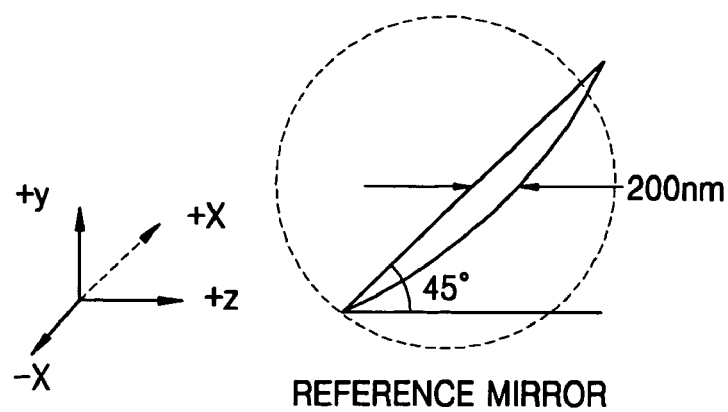
FIG. 7 is a view for defining the directions of X, Y, and Z axes with respect to a mirror.

Table 4 shows a result of analysis of allowance with respect to tilt of a mirror. The left side of Table 4 shows the WFE values with respect to a tilt error to Y-Z axes direction while the right side thereof shows the WFE values with respect to a tilt error to X-Z axes. The definitions of the X, Y and Z axes are shown in FIG. 7. The HOE is designed to correct mirror aberrations in which the PV value is 200 nm and a reference angle with respect to an optical axis is 45°. As it is shown in Table 4, when a tilt error of a mirror is about ±0.3° in the Y-Z axes direction, the maximum WFE value at the reference wavelength is 0.0253λ and the maximum WFE value in the overall wavelength range is about 0.0301λ. Thus, a sufficiently stable optical performance can be obtained even when a predetermined tilt error exists in the Y-Z axes direction. Also, as shown in Table 4, when a tilt error of +0.3° exists in the X-Z axes direction, the maximum WFE value at the reference wavelength is 0.0320λ and the maximum WFE value in the overall wavelength range is 0.0374λ. When a tilt error of −0.3° exists in the X-Z axes direction, the maximum WFE value at the reference wavelength is 0.026λ and the maximum WFE value in the overall wavelength range is 0.0302λ. Thus, even when a predetermined tilt error exists in the X-Z axes direction, a sufficient optical performance can be obtained.

Table 5 and Table 6 show results of analysis of the allowance with respect to decenter of a mirror. The left side of Table 5 shows the WFE values with respect to eccentricity in the X axis direction while the right side thereof shows the WFE values with respect to eccentricity in the Y axis direction. Table 6 shows the WFE values with respect to eccentricity in the X-Y axes direction. As shown in the left side of Table 5, even when eccentricity of about ±20 µm exists in the X-axis direction, the maximum WFE value at the reference wavelength is 0.0174λ and the maximum WFE value in the overall wavelength range is 0.0235λ, which is sufficiently stable. As shown in the right side of Table 5, even when eccentricity of about +20 µm and −20 µm exist in the Y-axis direction, the maximum WFE values at the reference wavelength are 0.0201λ and 0.0142λ and the maximum WFE values in the overall wavelength range are 0.0260λ and 0.0207λ, so that a sufficiently stable performance can be obtained. As shown in Table 6, a sufficiently stable performance can be obtained when eccentricity of about +20 µm simultaneously exists in both X and Y axes directions and eccentricities of +20 μm and −20 μm exist in the X and Y axes directions, respectively.

As described above, even when a correction pattern of the HOE is designed with respect to a mirror having a predetermined PV value, aberration due to a surface shape error of a mirror can be sufficiently corrected within a predetermined range. For example, for a mirror formed by wet etching a silicon wafer, by designing a correction element with respect to a typical shape of mirrors formed on the wafer, the aberration can be corrected within an allowable range with respect to other mirrors. Thus, since there is not need to manufacture various types of HOEs, mass production is made easy.

Figure 8A:
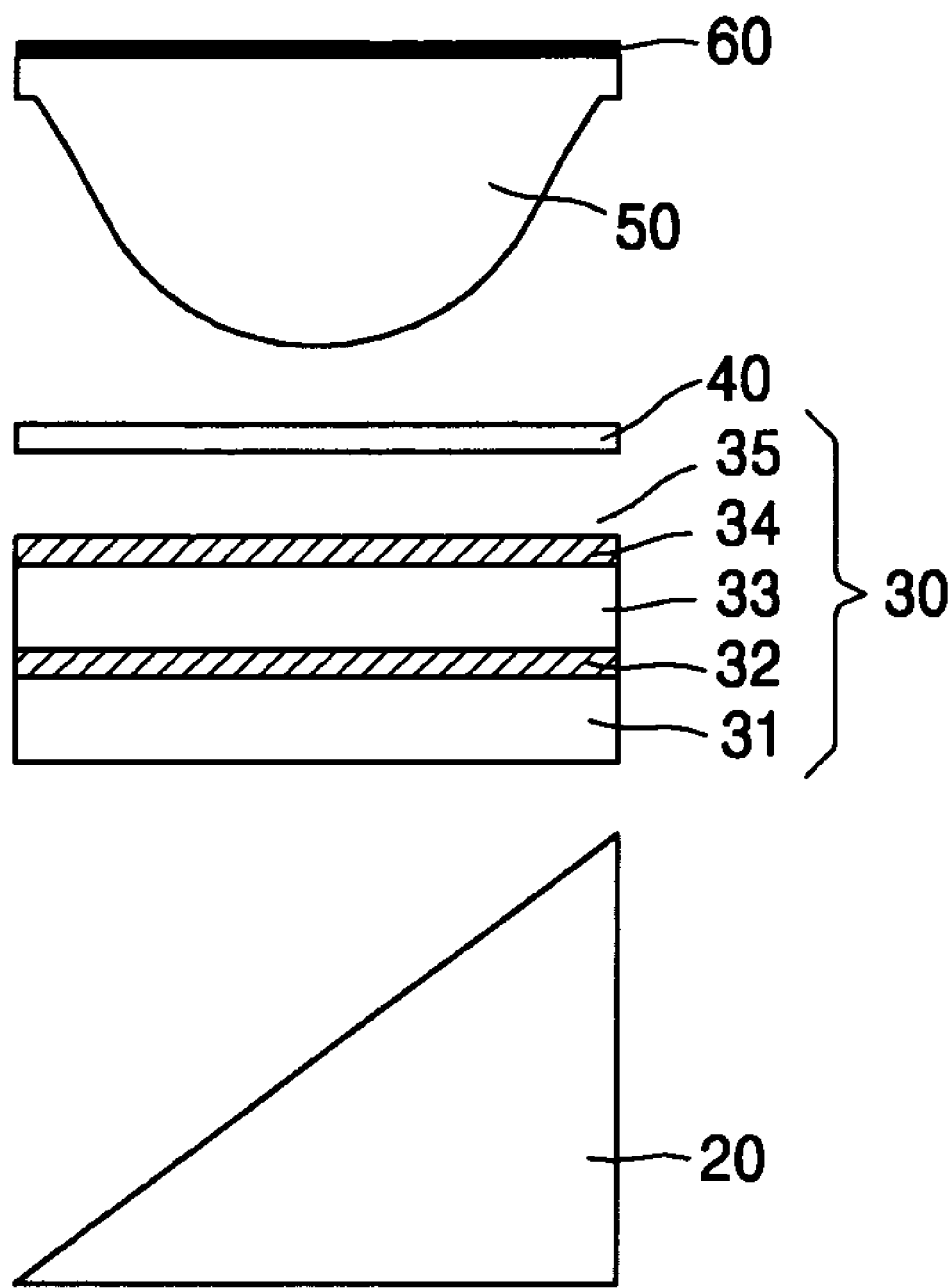
FIGS. 8A and 8B are views showing the relationship between the hologram optical element and other optical elements according to the present invention.
Figure 8B:
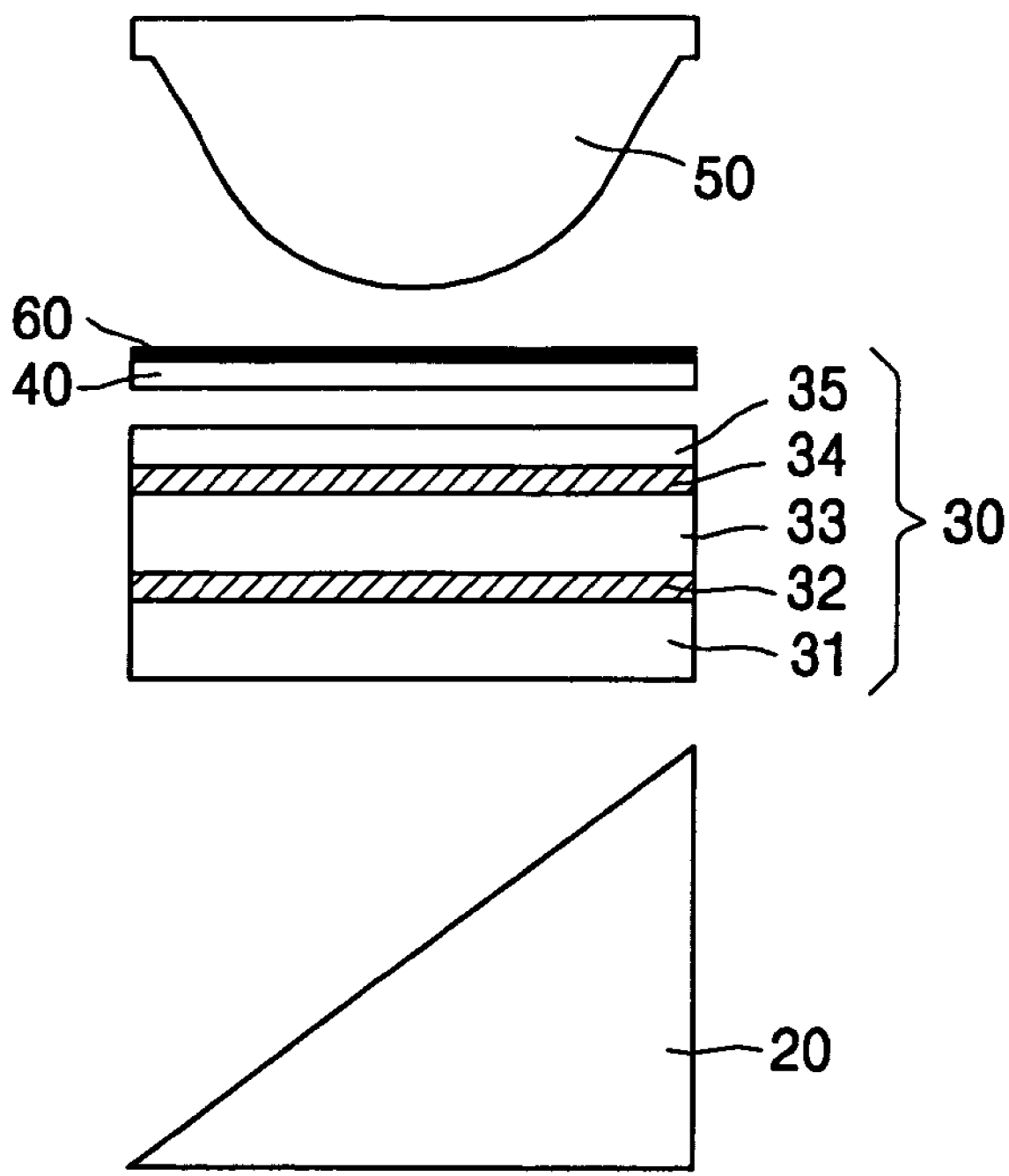

The HOE for correcting aberration of a mirror can be manufactured as an individual optical part or integrally formed with other optical part for miniaturization of an optical pickup apparatus. For example, as shown in FIG. 6C, the HOE 60 may be coupled to a surface of the optical path separation member 30. Further, the correction pattern of the HOE can be directly formed on a surface of the optical path separation member 30. Also, as shown in FIG. 8A, the HOE 60 can be attached to a flat surface of the refractive lens 50 or the correction pattern of the HOE can be directly formed thereon. Also, as shown in FIG. 8B, the HOE 60 can be attached to a surface of the diffractive lens 40 for correcting chromatism. In particular, the diffraction pattern for correcting chromatism and the holographic pattern for correcting aberration of a mirror can be simultaneously formed on the surface of the diffractive lens 40. The pattern for correcting chromatism is formed of a symmetric coefficient and the pattern for correcting the mirror aberration is formed of an asymmetric coefficient, so that a single surface of an optical element can designed and manufactured to perform two functions at the same time.

In the above description, the HOE for correcting aberration of a mirror according to the present invention with respect to the optical pickup apparatus. However, the HOE for correcting aberration of a mirror according to the present invention is not limited to the optical pickup apparatus and can be applied to all optical elements needing a high performance mirror. For example, instead of using a very expensive flat mirror having a PV value that is 1/20 of the wavelength, by using the HOE for correcting aberration of a mirror according to the present invention, a high performance optical element can be provided at a low cost.

TABLE 3

| | Wavelength (407 ± 5 nm) | | |
|---|---|---|---|
| | 412 nm | 407 nm | 402 nm |
| Waviness value (nm) | Optical performance WFE value (on/off axis) (λ) | | |
| 300 | 0.0344/0.0338 | 0.0301/0.0301 | 0.0325/0.0327 |
| 250 | 0.0218/0.0225 | 0.0157/0.0163 | 0.0204/0.0209 |
| 200 | 0.0161/0.0172 | 0.0056/0.0073 | 0.0150/0.0157 |
| 150 | 0.0219/0.0216 | 0.0162/0.0165 | 0.0219/0.0223 |
| 100 | 0.0337/0.0329 | 0.0306/0.0304 | 0.0344/0.0345 |

TABLE 4

| YZ-axis Tilt (deg) | Wavelength in use (nm) | WFE (on/off) (λ) |
|---|---|---|
| ±0.3 | 412 | 0.0301/0.0304 |
| | 407 | 0.0253/0.0258 |
| | 402 | 0.0279/0.0284 |
| ±0.2 | 412 | 0.0233/0.0237 |
| | 407 | 0.0170/0.0175 |
| | 402 | 0.0211/0.0215 |
| ±0.1 | 412 | 0.0184/0.0186 |
| | 407 | 0.0101/0.0110 |
| | 402 | 0.0173/0.0179 |
| XZ-axis Tilt (deg) | Wavelength in use (nm) | WFE (on/off) (λ) |
| +0.3 | 412 | 0.0374/0.0281 |
| | 407 | 0.0320/0.0235 |
| | 402 | 0.0352/0.0271 |
| +0.2 | 412 | 0.0282/0.0208 |
| | 407 | 0.0227/0.0138 |
| | 402 | 0.0254/0.0190 |
| +0.1 | 412 | 0.0206/0.0162 |
| | 407 | 0.0132/0.0063 |
| | 402 | 0.0187/0.0155 |
| −0.1 | 412 | 0.0169/0.0227 |
| | 407 | 0.0082/0.0165 |
| | 402 | 0.0164/0.0215 |
| −0.2 | 412 | 0.0224/0.0306 |
| | 407 | 0.0164/0.0256 |
| | 402 | 0.0208/0.0275 |
| −0.3 | 412 | 0.0302/0.04 |
| | 407 | 0.0261/0.0363 |
| | 402 | 0.0295/0.0375 |

TABLE 1

| Aberration | Mirror (waviness = 200 nm) | HOE having correction pattern | Mirror (waviness = 200 nm) + HOE having correction pattern |
|---|---|---|---|
| Astigmatism | +0.1430 | −0.1194 | +0.0255 |
| Defocus | −0.2148 | +0.1997 | −0.0168 |

TABLE 2

| Wavelength (nm) | Mirror (waviness = 0 nm) WFE (on/off axis) | Mirror (waviness = 200 nm) WFE (on/off axis) | Mirror (waviness = 0 nm) + HOE having correction pattern WFE (on/off axis) |
|---|---|---|---|
| 412 | 0.0148/0.0175 | 0.0612/0.0631 | 0.0161/0.0172 |
| 407 | 0.0014/0.0087 | 0.0588/0.0598 | 0.0056/0.0073 |
| 402 | 0.0142/0.0165 | 0.0596/0.0607 | 0.0150/0.0157 |

TABLE 5

| X-decenter (μm) | Wavelength in use (nm) | WFE (on/off) (λ) |
|---|---|---|
| ±20 | 412 | 0.0235/0.0239 |
|  | 407 | 0.0174/0.0179 |
|  | 402 | 0.0214/0.0216 |

| Y-decenter (μm) | Wavelength in use (nm) | WFE (on/off) (λ) |
|---|---|---|
| +20 | 412 | 0.0260/0.0192 |
|  | 407 | 0.0201/0.0116 |
|  | 402 | 0.0233/0.0174 |
| −20 | 412 | 0.0207/0.0284 |
|  | 407 | 0.0142/0.0229 |
|  | 402 | 0.0197/0.0252 |

TABLE 6

| XY-decenter (μm) | Wavelength in use (nm) | WFE (on/off) (λ) |
|---|---|---|
| +20 & +20 | 412 | 0.0308/0.0258 |
|  | 407 | 0.0262/0.0204 |
|  | 402 | 0.0286/0.0239 |
| −20 & −20 | 412 | 0.0276/0.0324 |
|  | 407 | 0.0223/0.0281 |
|  | 402 | 0.0253/0.0303 |

As described above, according to the present invention, aberration generated by an error in the shape of a surface of a mirror can be simply corrected by using a HOE. Thus, a high performance mirror can be obtained without using an expensive mirror. In particular, in an integrated optical pickup apparatus, deterioration in optical performance due to a mirror manufactured in a wet etching method can be reduced. Furthermore, since the structure of the HOE is simple, manufacture thereof is very simple. Since the minimum pitch is relatively large, there is no need to consider deterioration of efficiency. Therefore, the present invention can be easily applied to not only the optical pickup apparatus but also all optical products needing a high performance mirror and a product manufacturing cost can be reduced.

Although exemplary embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical system comprising:
   a light source generating light;
   a mirror changing an optical path of the light generated by the light source; and
   an aberration correcting element correcting an aberration generated in light reflected from the mirror due to an error in a shape of a surface of the mirror;
   wherein the aberration correcting element is a holographic optical element in which an aberration correction pattern is disposed on a surface thereof; and
   the aberration correction pattern of the holographic optical element has an aberration value having a sign opposite to an aberration value of the mirror.

2. The optical system as claimed in claim 1, wherein the aberration correcting element is disposed on an optical path of the light reflected by the mirror.

3. The optical system as claimed in claim 1, wherein a pattern coefficient determining the aberration correction pattern of the holographic optical element comprises coefficients of terms y, $x^{2n}$, and $y^{2n}$ wherein n is an integer value greater than or equal to one.

4. The optical system as claimed in claim 1, wherein a pattern coefficient determining the aberration correction pattern of the holographic optical element comprises coefficients of terms x, y, $x^{3n}$, and $y^{3n}$ wherein n is an integer value greater than or equal to one.

5. The optical system as claimed in claim 1, wherein a minimum pitch of the aberration correction pattern of the holographic optical element is not less than 10 μm.

6. An optical pickup apparatus comprising:
   a light source generating light;
   a mirror changing an optical path of the light generated by the light source;
   an aberration correcting element correcting an aberration generated in light reflected from the mirror due to an error in a shape of a surface of the mirror;
   an objective lens optical system concentrating the light reflected by the mirror onto an optical disc;
   a photodetector detecting information by receiving light reflected from the optical disc; and
   an optical path separation member disposed on an optical path between the objective lens optical system and the photodetector and refracting the light reflected from the optical disc towards the photodetector;
   wherein the aberration correcting element is a holographic optical element in which an aberration correction pattern is disposed on a surface thereof; and
   the aberration correction pattern of the holographic optical element has an aberration value having a sign opposite to an aberration value of the mirror.

7. The optical pickup apparatus as claimed in claim 6, wherein a coefficient determining the aberration correction pattern of the holographic optical element is an asymmetrical coefficient.

8. The optical pickup apparatus as claimed in claim 6, wherein a minimum pitch of the aberration correction pattern of the holographic optical element is not less than 10 μm.

9. The optical pickup apparatus as claimed in claim 6, wherein the objective lens optical system comprises a diffractive lens correcting chromatism due to a change in wavelength of the light generated by the light source and an Aspheric-Plano refractive lens focusing incident light on the optical disc.

10. The optical pickup apparatus as claimed in claim 9, wherein the holographic optical element is coupled to the Aspheric-Plano refractive lens.

11. The optical pickup apparatus as claimed in claim 9, wherein the holographic optical element is coupled to the diffractive lens.

12. The optical pickup apparatus as claimed in claim 11, wherein a first correction pattern for the holographic optical element to correct aberration of the mirror and a second correction pattern for the diffractive lens to correct chromatism are both disposed on a surface of the diffractive lens.

13. The optical pickup apparatus as claimed in claim 12, wherein a coefficient determining the first correction pattern is an asymmetrical coefficient and a coefficient determining the second correction pattern is a symmetrical coefficient.

14. The optical pickup apparatus as claimed in claim 6, wherein the optical path separation member comprises:
   a polarization diffractive element that linearly transmits or diffractively transmits incident light according to a polarization state of the incident light, a quarter wave plate changing the polarization state of the incident light, and a coating layer disposed on one surface of the polarization diffraction element and on each of input/output surfaces of the quarter wave plate.

15. The optical pickup apparatus as claimed in claim 14, wherein the holographic optical element is coupled to the optical path separation member.

16. The optical pickup apparatus as claimed in claim 6, wherein the optical path separation member comprises:

a polarization diffractive element that linearly transmits or diffractively transmits incident light according to a polarization state of the incident light, and a quarter wave plate changing the polarization state of the incident light.

* * * * *